Aug. 23, 1960     J. W. (AMOS) BUCHANAN     2,949,718
WINDROW REGULATING ATTACHMENT

Filed July 11, 1958     3 Sheets-Sheet 1

INVENTOR
J.W. (Amos) Buchanan

BY

ATTORNEY

Aug. 23, 1960 J. W. (AMOS) BUCHANAN 2,949,718
WINDROW REGULATING ATTACHMENT
Filed July 11, 1958 3 Sheets-Sheet 2

INVENTOR
J. W. (Amos) Buchanan

BY *Hastings Ashley*
ATTORNEY

INVENTOR
J. W (Amos) Buchanan

United States Patent Office 2,949,718
Patented Aug. 23, 1960

2,949,718

WINDROW REGULATING ATTACHMENT

J. W. (Amos) Buchanan, Rte. 3, Waxahachie, Tex.

Filed July 11, 1958, Ser. No. 747,926

8 Claims. (Cl. 56—192)

This invention relates to grain cutting and windrowing apparatus and more particularly to an attachment for a windrower which is provided with a pair of transversely spaced horizontal conveyors behind the sickle thereof which transport grain cut by the sickle to a central opening between the conveyors whereby the grain is deposited in a windrow as the windrower traverses a field of grain.

An object of this invention is to provide a new and improved attachment for windrowers having a pair of spaced transversely moving conveyors for transporting grain cut by the sickle of the windrower to the discharge opening between the conveyors.

Another object is to provide an attachment for such windrowers for selectively regulating the width of the opening through which the cut grain is allowed to fall upon the ground to form a windrow thereon.

A still further object of the invention is to provide an attachment for windrowers having a discharge aperture behind the sickle thereof through which grain cut by the sickle of the windrower is directed to fall upon the ground to form a windrow, which attachment has means selectively extendable across the discharge aperture to regulate the width of the aperture.

A further object of the invention is to provide an attachment for a windrower which prevents undue scattering of short grain by narrowing the discharge aperture behind the sickle of the windrower through which the cut grain is allowed to fall to the earth.

A still further object of the invention is to provide an attachment, of the type described above, which may be easily and economically secured to a windrower.

A still further object of the invention is to provide an attachment for a windrower having a longitudinal opening behind the sickle thereof through which grain cut by the sickle is allowed to fall to the ground to form a windrow, which includes a pair of plates movable simultaneously in opposite directions to reduce or narrow the transverse width of the longitudinal gap whereby the width of the windrow may be regulated.

Still another object of the invention is to provide an attachment for a windrower wherein means which are operable from a driver's seat are provided to selectively and simultaneously move the reciprocable plates toward and away from each other in the discharge opening between a pair of transverse conveyors of the windrower to regulate the width of the windrow.

Additional objects and advantages of the invention will be readily apparent from the reading of the following description of a device constructed in accordance with the invention, and reference to the accompanying drawings thereof, wherein.

Figure 1:
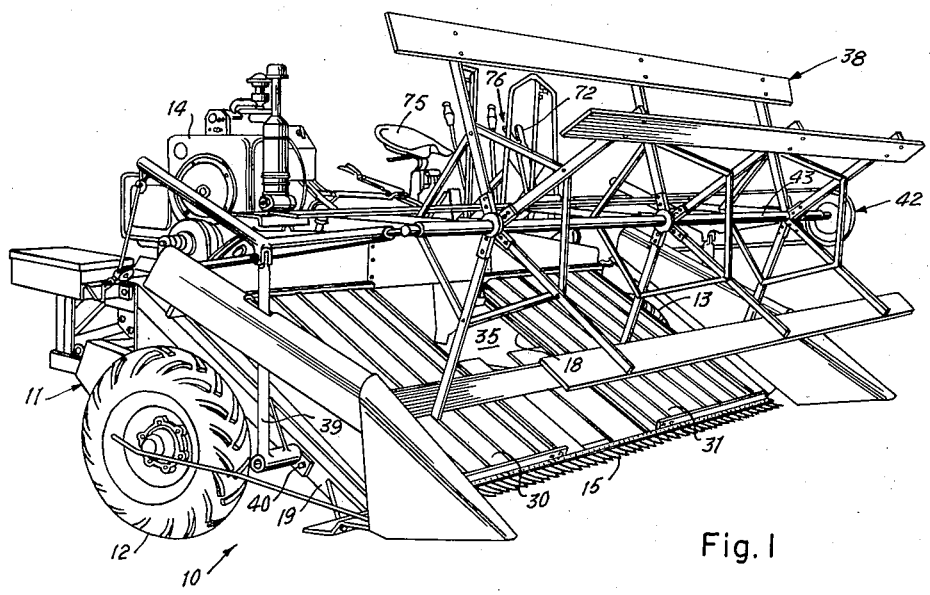
Figure 1 is a perspective view of a windrower provided with the attachment of the invention.
Figure 2:
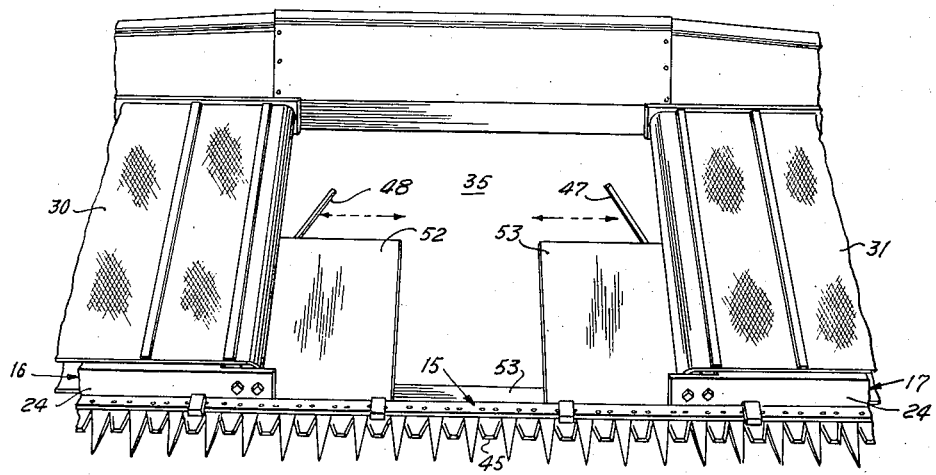
Figure 2 is a fragmentary enlarged front perspective view showing the adjusting plates extending into the longitudinal space between the transverse conveyors of the windrower.
Figure 3:
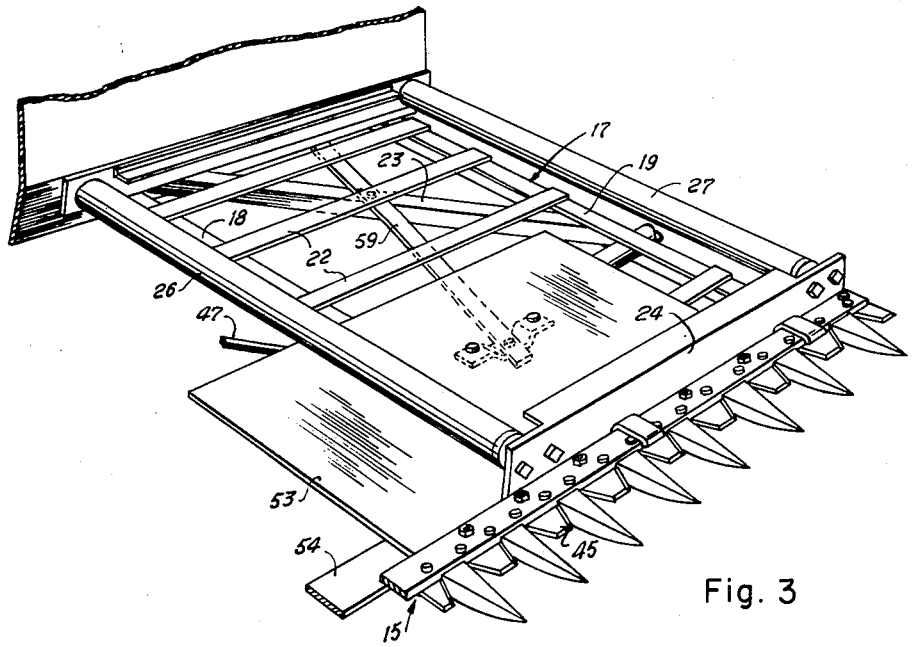
Figure 3 is a fragmentary enlarged perspective view of the forward portion of the windrower, with the conveyor belts removed, showing the adjusting plates in position on the side frames of the windrower.
Figure 4:
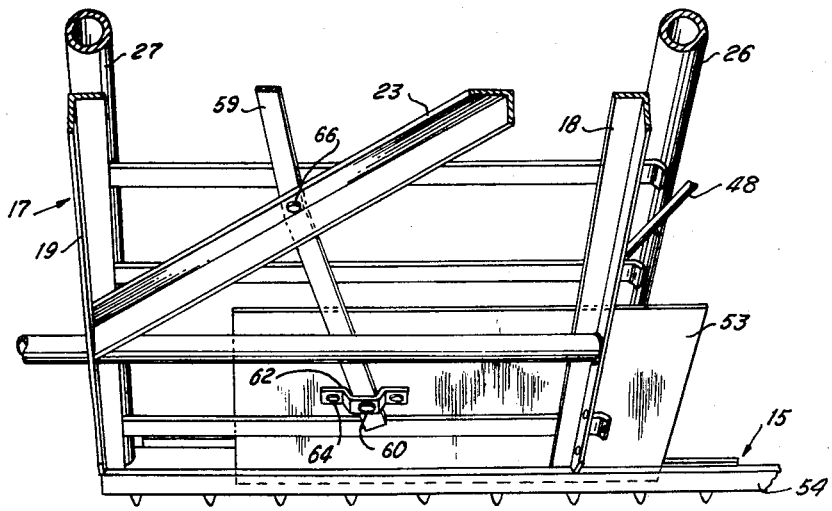
Figure 4 is a bottom view of one of the side plates mounted on one of the side frames of the windrower.
Figure 5:
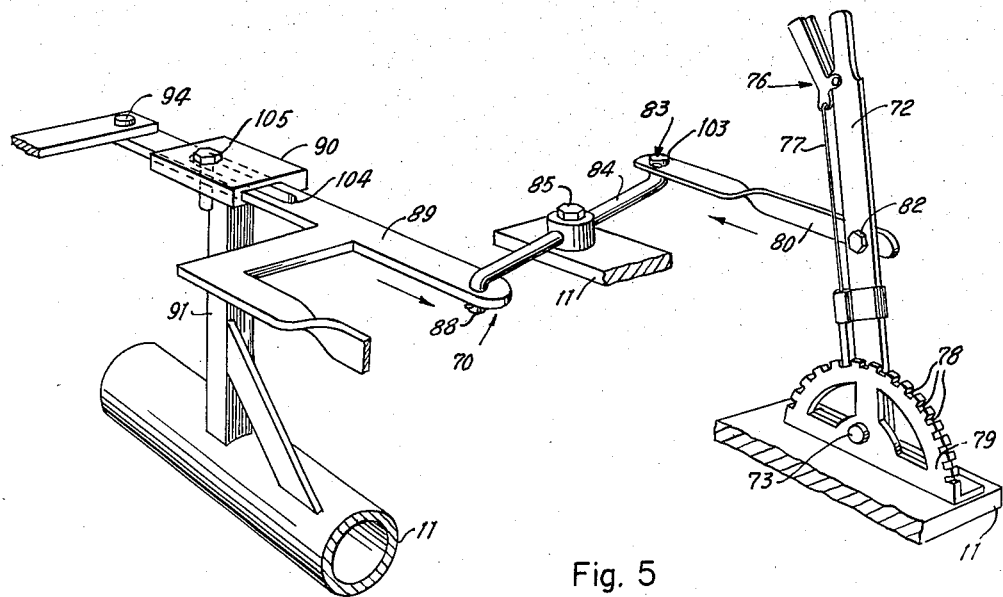
Figure 5 is a perspective view showing the operating linkage of the adjustable plates mounted on the self-propelled windrower of Figure 1; and, Figure 6 is a diagrammatic perspective view of the plates, together with the operating linkage thereof.

Referring now to the drawings, the self-propelled windrower 10 includes a main frame 11 mounted on a pair of ground engaging wheels 12 and 13 which are driven through any suitable transmission (not shown) by a prime mover 14 mounted on the main frame. The prime mover 14 may be a gasoline or diesel engine. The windrower is provided with usual sickle bar 15 which is rigidly secured to the main frame 11 by a pair of transversely spaced forwardly extending side frames 16 and 17. The side frames are comprised of a pair of forwardly extending angle members 18 and 19 whose rear upper ends are secured to the main frame in any suitable manner, as by welding, and whose lower ends are secured to and support the sickle bar 15. The angle members 18 and 19 of each of the side frames are held rigidly in transversely spaced relation to each other by means of a plurality of cross bars 22 and by a diagonally extending angle member 23. Each of the side frames 16 and 17 is also provided with an upstanding flange 24 at its forward end to which are rotatably secured, by any suitable means, the lower ends of belt conveyor rollers 26 and 27.

The upper ends of the rollers are rotatably mounted on the main frame 11. Belt conveyors 30 and 31 extend about the rollers 26 and 37 associated with each of the side frames and are simultaneously movable by means of any suitable transmission (not shown) connecting the drive shaft of the prime mover and at least one of the rollers 26 and 27 of each of the belt conveyors in the usual conventional manner. The belt conveyors 30 and 31 move transversely toward a central discharge opening 35 between the side frames.

The usual reel 38 is also mounted on the angle member 19 of each of the side frames by means of standards 39 which may be secured to the angle members by bolts 40 or in any other suitable manner. The reel is rotated by means of a belt and pulley transmission 42 which connects the shaft 43 of the reel with the drive shaft of the prime mover.

It will thus be apparent that the windower 10 described is of the conventional type having a sickle bar 15 in which a sickle 45 is mounted for reciprocable movement by means of the usual transmission, not shown, which connects one end of the sickle to the drive shaft of the prime mover 14 to effect reciprocation of the sickle with respect to the sickle bar and thus cause the teeth of the sickle to cut the grain as the windrower moves through a field of standing grain in the usual manner. The reel 38 bends the standing and cut grain towards the conveyors 30 and 31 as the grain is cut to cause the grain to be deposited thereon. Since the conveyors are being simultaneously driven to move the cut grain towards the discharge opening 35, the cut grain is moved by the conveyors to the discharge opening 35 and falls therethrough to form a windrow on the ground. Guide bars 47 and 48 extend inwardly from the angle members 19 of the side frames to help guide the cut grain in its movement through the discharge opening to the ground to form a narrow windrow which may be easily picked up by a combine which follows the windrower.

The above described windrower functions effectively when the grain is tall but it is found that when a field of short grain is cut, the grain forms a very loose scattered windrow which is difficult for the combine to pick up and which results in loss of the grain, so that grain is left scattered on the ground after the combine is passed thereover. The attachment 50 of the invention effectively prevents the scattering of short grain into a loose windrow by narrowing the transverse width of the discharge opening.

The attachment 50 includes a pair of transversely movable plates 52 and 53, each of which is disposed between the side frames 16 and 17 and the rollers 26 and 27 of the belt conveyors 30 and 31. The belt conveyors themselves, of course, are disposed above the plates 52 and 53. The lower edges of the plates 52 and 53 rest upon the rear portions 54 of the sickle bar 15.

The attachment plates 52 and 53 are each supported by arms 58 and 59, respectively, which have their lower ends pivotally connected to the plates by means of bolts 60 which extend through suitable apertures in the arms 58 and 59 and in the straps 62 rigidly secured to the bottom surfaces of the plates 52 and 53 by means of rivets 64 or any other suitable means. It will be apparent that the lower ends of the arms 58 and 59 extend or are disposed between the brackets 62 and the lower surfaces of the plates. In this manner the plates are supported on the support arms 58 and 59.

The support arms 58 and 59 are pivotally connected by means of bolts 66 to the angle members 23 of each of the side frames 16 and 17, the support arms being in the form of flat strips and being disposed below the cross members 22 and above the angle members 23 of the side frames so that the support arms do not contact the belt conveyors.

The support arms are simultaneously pivotable about their pivot bolts or pins 66 in opposite directions by a linkage 70 which includes an operating lever 72 pivotally mounted at its lower end, by means of a bolt 73 to the latch frame 59 rigidly secured to the main frame of the self-propelled windrower, in such position as to be readily accessible to the operator occupying the seat 75. The lever 72 is preferably provided with a conventional latch means 76 which includes a slidable rod 77 mounted on the lever 72 which is engageable in the recesses 78 of the latch plate 79 whereby the lever may be moved to any one of several positions and held in such positions by the engagement of the rod 77 in a selected notch or recess 78 of the latch member 79.

The operating lever has a link 80 pivotally secured to it, as at 82, by any suitable means, such as a bolt, the other end of the link 80 being pivotally connected, as at 83, to a pivot bar 84 which is pivotally connected, as the main frame 11 of the machine by a bolt or pivot pin 85 intermediate its ends. The lower end of the pivot bar 84 is pivotally secured, as at 88, to a slide bar 89 which is slidably mounted in a sleeve 90 mounted on a post 91 of the main frame 11. The support arm 59 is connected to the slide bar 89 by means of an angle member 92, one of whose ends is rigidly secured to the slide bar 89, as by welding, and whose other end is secured pivotally as at 93 to the upper end of the support arm 59 by a bolt or other suitable pivot means.

The end of the slide bar 89 remote from the pivot bar 84 is pivotally connected, as at 94, by means of a bolt or other means to a pivot link 95 which is pivotally secured to the main frame 11, intermediate its ends, as at 96, by means of a bolt or other suitable means. The other end of the pivot link 95 is pivotally secured, as at 98, by means of a bolt or other suitable means to one end of a link 100 whose other end is pivotally connected, as at 102, by means of a bolt or other suitable means to the upper end of the support arm 58 of the plate 52.

The pivot bar 84 and the link 100 may have angularly extending end portions which are receivable in apertures in the other members of the linkage to provide the desired pivotal connections. Cotter pins 103 may be provided to prevent accidental displacement of such end portions from engagement with the other elements of the linkage.

The slide bar 89 may be provided with a slot 104 through which a pin 105, extending through aligned apertures of the guide sleeve, may pass to limit the movement of the slide bar.

The various pivotal connections and the slidable fit of the slide bar 89 in the sleeve 90 have sufficient tolerances or loose fits to permit any relative movement of the various parts of the operating linkage with respect to each other necessary to accommodate their displacement relative to one another due to the arcuate movements of the various pivotal connections. Similarly the plates 52 and 53 rest slidably on the sickle bar 15 to permit movement thereon, the rear end 54 of the sickle bar projecting backwardly far enough to permit some longitudinal displacement of the plates 52 and 53 occasioned by the arcuate path of movement of the lower ends of the support arms. In addition, the fit of the bolts 60 in the aligned apertures in the lower ends of the support arms and in the straps 62 may be loose to permit some longitudinal movement of the plates 52 and 53 relative to the support arms.

Figure 6:
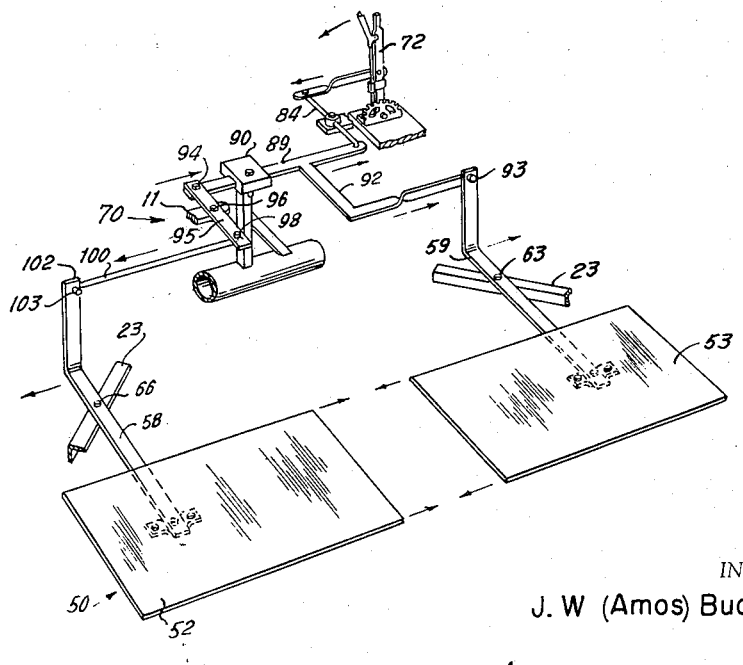

It will now be apparent that if the operator of the windrower wishes to narrow the effective discharge opening 35 of the windrower, he grasps the upper end of the operating lever 72 and pivots it in a clockwise manner, Figure 6, about the pivot points 73 to a suitable position wherein the lever is then held by the latch means 76. During such counter clockwise movement of the operating lever 72, the pivot bar 84 is also pivoted or rotated in a clockwise manner about its pivot point 85. As a result, the slidable bar 89 is moved to the left, Figure 6, causing the support arm 59 to pivot in a counter clockwise manner about its pivot point 66 and, since the plate 53 is connected to the lower end of the support arm 59 which is thus moved outwardly or to the right, Figure 6, the plate 53 will move outwardly beneath the conveyor 31 thus increasing on one side the transverse dimension of the discharge opening 35. Simultaneously the pivot link 95 is caused to move in a counter clockwise manner about its pivot point 96 and, since the link 100 is connected to the lower end of the pivot link 95, the link 100 is moved inwardly or towards the right. As a result, the support arm 58 is pivoted in a counter clockwise manner about its pivot point 66 and the plate 52, which is connected to the lower end of the support arm 58, is moved outwardly to the left to increase the effective width of the discharge opening 35. In this manner the width of the discharge opening is increased by the simultaneous outward movement of the plates.

When it is desired to decrease the width of the discharge opening 35, as when short grain is to be cut and windrowed, the operating lever 72 is moved in a counterclockwise manner about its pivot point 73 to any predetermined position wherein it is latched by the engagement of the rod 77 in an appropriate recess 78 of the latch plate 79. During such counter clockwise pivotal movement of the operating lever 72, the pivot bar 84 is also pivoted or rotated in a counter clockwise manner about its pivot point 85 since its upper end is connected to the lever 72 by the link 80. As a result, the slidable bar 89 is moved to the right, Figure 6, causing the support arm 59 to be pivoted in a clockwise manner about its pivot point 66 thus moving the plate 53 inwardly to the left to decrease the transverse width of the discharge opening 35. Simultaneously, the pivot link 95 is pivoted or rotated in a clockwise manner about its pivot point 96 and, since the support arm 58 is connected to the lower end of the pivot link 95, it is pivoted in a counter clockwise manner about its pivot point 66. As a result, the plate 52 which is connected to the lower end of the support arm 58 is moved to the right to decrease the effective width of the discharge opening 35. In this manner the transverse width of the discharge opening is decreased by simultaneous inward movement of the plates. While a particular linkage for moving the pair of plates simultaneously toward and away from each other has been shown, it will be readily apparent that any means for so simultaneously shifting the plates may be used for varying the effective width of the discharge opening between the conveyor belts.

It will now be seen that the new and improved attachment for a windrower having a central discharge opening to which the cut grain is moved by a pair of transverse conveyors for discharge through such opening to the ground to form a windrow, includes a pair of plates which are simultaneously moved toward and away from each other to effectively decrease or increase the effective width of the discharge opening.

It will further be seen that the plates are mounted beneath the conveyors whereby the operation of the conveyors is not interfered with by such attachment.

It will further be seen that the operating means for moving the plates 52 and 53 is simple in construction and economical of fabrication comprising a plurality of links and pivot bars or arms which are easily attachable to the frame of the windrower.

It will further be seen that the attachment for the windrower may be easily and readily attached to the windrower without extensive modification or alteration of such windrower.

It will now be seen that a new and improved attachment for windrowers having a pair of transversely moving conveyors for discharging grain carried thereby through a discharge opening between such transverse conveyors onto the ground to form a windrow has been illustrated and described which includes means, such as the plates 52 and 53, which are movable into such discharge opening to decrease the effective width of the discharge opening to prevent undue scattering of the grain.

It will further be seen that the new and improved attachment includes a pair of plates mounted between such conveyors and movable transversely with respect to the windrower to regulate the effective width of such discharge opening.

It will further be seen that the attachment includes a linkage for simultaneously moving the plates in opposite directions whereby the effective width of the discharge opening may be readily regulated.

It will further be seen that the linkage may be easily operated by an occupant of the driver's seat of the windrower without leaving the seat or without stopping operation of the windrower.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. An attachment for a windrower having cutting means for cutting grain and a pair of rearwardly extending conveyors which are movable transversely to discharge grain cut by the cutting means through a discharge opening between such conveyors onto the ground to form a windrow comprising: means mountable on said windrower on opposite sides of said discharge opening and movable transversely in a single plane with respect to said windrower for effectively regulating the transverse width of said discharge opening.

2. An attachment for a windrower having a transversely disposed cutting means and a pair of conveyors movable transversely to cause grain cut by said cutting means to be moved to a discharge opening between said conveyors to fall therethrough to the ground to form a windrow including: a pair of flat plates mounted on said windrower on opposite sides of said discharge opening beneath said conveyors and movable in a single plane into said discharge opening to effectively vary the transverse width of said discharge opening.

3. An attachment for a windrower having a transversely disposed cutting means and a pair of conveyors movable transversely to cause grain cut by said cutting means to be moved to a discharge opening between said conveyors to fall therethrough to the ground to form a windrow including: a pair of flat plates mounted on said windrower on opposite sides of said discharge opening beneath said conveyors and movable in a single plane into said discharge opening to effectively vary the transverse width of said discharge opening; and means for simultaneously moving said plates toward and away from each other whereby the effective transverse width of said discharge opening may be regulated.

4. An attachment for a windrower having a seat, a transversely disposed cutting means and a pair of conveyors movable transversely to cause grain cut by said cutting means to be moved to a discharge opening between said conveyors to fall therethrough to the ground to form a windrow including: a pair of flat plates mounted on said windrower on opposite sides of said discharge opening beneath said conveyors; and means operable from the seat of said windrower for simultaneously moving said plates in a single plane toward and away from each other to preselected positions for adjusting the effective width of the discharge opening.

5. An attachment for a windrower having a transversely disposed cutting means and a pair of conveyors movable transversely to cause grain cut by said cutting means to be moved to a discharge opening between said conveyors to fall therethrough to the ground to form a windrow including: a pair of flat plates mounted on said windrower on opposite sides of said discharge opening beneath said conveyors; and means for simultaneously moving said plates in a single plane toward and away from each other to regulate the effective transverse width of said discharge opening, said last mentioned means including a linkage connecting said plates and an operating lever.

6. An attachment for a windrower having a transversely disposed cutting means and a pair of conveyors movable transversely to cause grain cut by said cutting means to be moved to a discharge opening between said conveyors to fall therethrough to the ground to form a windrow including: a pair of plates mounted on said windrower on opposite sides of said discharge opening beneath said conveyors; and means for simultaneously moving said plates toward and away from each other to regulate the effective transverse width of said discharge opening, said last mentioned means including a linkage connecting said plates and an operating lever, said linkage including support bars extending beneath said plates and having lower ends pivotally connected to intermediate portions of said plates whereby said plates are supported on said support bars.

7. An attachment for a windrower having a transversely disposed cutting means and a pair of conveyors movable transversely to cause grain cut by said cutting means to be moved to a discharge opening between said conveyors to fall therethrough to the ground to form a windrow including: a pair of plates mounted on said windrower on opposite sides of said discharge opening beneath said conveyors; and means for simultaneously moving said plates toward and away from each other to regulate the effective transverse width of said discharge opening, said last mentioned means including a linkage connecting said plates and an operating lever, said linkage including support bars extending beneath said plates and having lower ends pivotally connected to intermediate portions of said plates whereby said plates are supported on said support bars, said support arms being pivotally connected to the fixed structure of said windrower on opposite sides of said discharge opening.

8. An attachment for a windrower having a transversely disposed cutting means and a pair of conveyors movable transversely to cause grain cut by said cutting means to be moved to a discharge opening between said conveyors to fall therethrough to the ground to form a windrow including: a pair of plates mounted on said windrower on opposite sides of said discharge opening beneath said conveyors; and means for simultaneously moving said plates toward and away from each other to regulate the effective transverse width of said discharge opening, said last mentioned means including a linkage connecting said plates and an operating lever, said linkage including support bars extending beneath said plates and having lower ends pivotally connected to intermediate portions of said plates whereby said plates are supported on said support bars, said support arms being pivotally connected to the fixed structure of said windrower on opposite sides of said discharge opening, and a plurality of interconnected links and levers connecting the upper ends of said support arms to said operating lever.

References Cited in the file of this patent

UNITED STATES PATENTS

| | | |
|---|---|---|
| 1,948,927 | Lindgren et al. | Feb. 27, 1934 |
| 2,790,289 | Tufford | Apr. 30, 1957 |